United States Patent [19] [11] 4,199,538
Wu [45] Apr. 22, 1980

[54] METHOD FOR MAKING HOT-PRESSED THERMOPLASTIC ELEMENTS FOR GLASS-PLASTIC LENSES

[75] Inventor: Shy-Hsien Wu, Horseheads, N.Y.
[73] Assignee: Corning Glass Works, Corning, N.Y.
[21] Appl. No.: 939,121
[22] Filed: Sep. 5, 1978
[51] Int. Cl.² ................. B29D 11/00; B29C 3/00
[52] U.S. Cl. .......................................... 264/1; 264/320
[58] Field of Search ................. 264/1, 320, 234, 345

[56] References Cited
U.S. PATENT DOCUMENTS

| 2,302,918 | 11/1942 | Smith | 264/1 |
|---|---|---|---|
| 2,330,837 | 10/1943 | Mullen | 264/1 |
| 2,635,289 | 4/1953 | Owens | 264/1 |
| 2,644,985 | 7/1953 | Crandon | 264/1 |
| 3,681,483 | 8/1972 | Moore | 264/1 |

FOREIGN PATENT DOCUMENTS

| 238122 | 5/1960 | Australia | 264/1 |
|---|---|---|---|
| 819474 | 9/1959 | United Kingdom | 264/1 |

Primary Examiner—James B. Lowe
Attorney, Agent, or Firm—Kees van der Sterre; Clinton S. Janes, Jr.

[57] ABSTRACT

A method for making curved zero-power plastic lens elements of precise curvature and excellent optical quality, wherein thin (not exceeding 15-mil) commercial-grade thermoplastic sheet is reformed through a hot-pressing procedure using optically smooth (e.g., glass) reforming surfaces having a specified relation of curvature, is described.

4 Claims, 2 Drawing Figures

METHOD FOR MAKING HOT-PRESSED THERMOPLASTIC ELEMENTS FOR GLASS-PLASTIC LENSES

BACKGROUND OF THE INVENTION

The present invention is in the field of glass-plastic composites and particularly relates to the manufacture of curved plastic elements of optical quality for laminated glass-plastic lenses.

Glass-plastic lenses have been the subject of research because they combine the chemical durability of glass with the toughness, light weight and tintability of plastics. An early example of such a composite is the laminated glass-plastic lens described by Rogers in U.S. Pat. No. 2,263,249, which combines a glass lens element with a curved plastic element composed of a light-polarizing polyvinyl alcohol plastic sheet, providing a durable polarizing lens. More recent examples of laminated glass-plastic lenses include the glass-plastic safety lens described by French et al. in U.S. Pat. No. 3,867,235, consisting of a conventional glass lens backed by a clear, tough polymeric film.

A number of tough, optically clear thermoplastic films have been considered for composite fabrication, including, for example, cellulosic, polycarbonate, acrylic and ionomer films. The use of such films in the fabrication of curved composite lenses for ophthalmic applications involves a substantial problem of optical quality. The direct lamination of a composite lens using flat thermoplastic film stock or ordinary commercial quality does not typically provide a distortion-free product suitable for ophthalmic use.

Supplemental calendering with rollers can produce flat thermoplastic film of good optical quality. However, with the exception of cast acrylic films, ordinary commercial thermoplastic film manufactured by conventional blowing, casting, or extrusion methods typically exhibits surface defects such as streaks, dimples and the like, rendering the film unsuitable for ophthalmic use. Such defects cannot be removed from tough thermoplastic film by ordinary hot-pressing between polished flat plates. At hot-pressing temperatures high enough to thermally remove manufacturing defects, irregular loop-type markings are produced in the film, perhaps due to the presence of trapped air, which remain in the film over the entire reforming temperature range up to temperatures at which plastic foaming occurs.

In addition to excellent film quality, good optical performance in a laminated lens requries close curvature matching between glass and plastic elements. This matching is aided if preformed curved plastic elements are used in lamination. Vacuum reforming processes have been used to reform relatively thick flat film (e.g. 30 mil cellulose acetate butyrate) into spherically curved plastic elements for sunglass lenses and the like, but such processing is not adaptable to the reforming of thin thermoplastic films, particularly within the thickness range of about 1–15 mils. Moreover, the curvature of the reformed piece may not be precisely controlled, and the reformed plastic has not been of ophthalmic quality. Thin films tend to wrinkle and then stick to reformer surfaces in conventional vacuum reforming equipment. Release coatings which might alleviate this sticking problem, such as fluorocarbon coatings, impart objectionable surface texture to the soft plastic during forming.

SUMMARY OF THE INVENTION

According to the present invention, curved plastic elements of specified curvature and excellent optical quality are provided by reforming thin tough thermoplastic film of ordinary commercial quality between a pair of appropriately matched, polished, rigid curved mold surfaces. With appropriate matching of these reforming surfaces, the problem of heat-loop defects can be overcome without the use of vacuum equipment, and preformed tough plastic elements suitable for producing laminated glass-plastic lenses of ophthalmic quality can be provided.

Specifically, the reforming method of the invention comprises heating tough, thermoplastic film to a temperature above its glass transition temperature while presssing the film between a convex reforming surface and a concave reforming surface, each of said surfaces being formed of a hard, rigid material which has been finished to optical surface quality. Heat-loop defects are avoided by insuring that the radius of curvature of the convex reforming surface is less than the radius of curvature of the concave reforming surface, so that the surfaces are divergent.

The pressure which is applied to the film by the reforming surfaces is that pressure sufficient to remove all surface defects from the film. The optimum pressure depends on both plastic composition and reforming temperature, ranging, for example, from slight positive pressure in the case of hot soft cellulose acetate butyrate to over 700 psi for some tough polycarbonates. In general, best results, in terms of minimizing heat loop defects, are obtained if the pressure is increased to the selected maximum pressure over the length of the pressure cycle.

After the pressure cycle is completed, the film is cooled to a temperature at least below its glass transition temperature prior to separation from the reforming surfaces. Preferably, the film is cooled to room temperature prior to separation in order to obtain a precise curvature match with the reforming surfaces.

Through the use of appropriately matched mold pairs, proper hot-pressing conditions, and film cooling in contact with the reforming surfaces, curved plastic lens elements of optical quality and precise curvature are obtained from flat commercial-quality film in a single reforming operation. Such elements cannot be produced from thin ($\leq 15$ mils) films by calendering and/or vacuum reforming methods, and are produced only with difficulty from thick films, requiring the use of both calendering and vacuum reforming techniques.

DESCRIPTION OF THE DRAWING

The invention may be further understood by reference to the drawing wherein.

DETAILED DESCRIPTION

Figure 1:
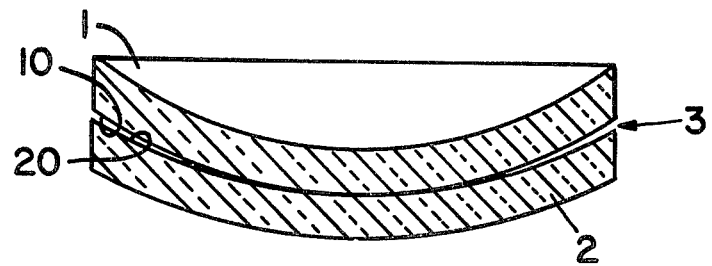
FIG. 1 consists of a schematic elevational view in cross-section of a pair of appropriately matched molding elements 1 and 2 comprising reforming surfaces 10 and 20, respectively. Elements 1 and 2 are formed of a hard, rigid material such as glass. The elements are shown in nesting contact with the center of convex reforming surface 10 being in contact with the center of concave reforming surface 20. The radius of curvature of convex reforming surface 10 is less than the radius of curvature of concave reforming surface 20, as evidenced by the presence of circumferential edge gap 3 between surfaces 10 and 20.
Figure 2:
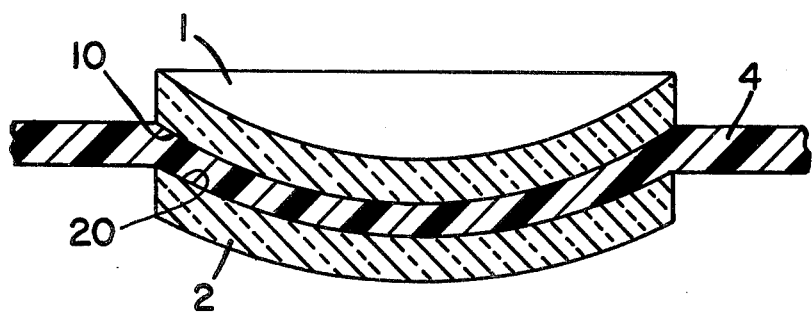
FIG. 2 consists of a second schematic elevational view in cross-section of molding elements 1 and 2 wherein a section of tough thermoplastic film 4 is positioned between convex reforming surface 10 and concave reforming surface 20. This film is heated above its glass transition temperature while pressure is applied thereto by the molding elements 1 and 2. After the pressure is released, the assembly cooled, and film 4 removed from between elements 1 and 2, it is found that film 4 has been reformed into a curved plastic element of precise curvature and optical quality, free from the development of heat-loop defects.

The composition of the material used to fabricate the reforming surfaces is not critical, provided that it is rigid and will take a smooth finish. Hence metals, glasses, glass-ceramics or other hard materials may be used to provide mold elements, or the surfacing material for mold elements. A particularly suitable material is glass, since equipment for providing surfaces of precise curvature and optical quality on glass elements is widely used in the ophthalmic industry. For the purpose of the present description a surface of optical quality is one having a surface roughness not exceeding about 1 μm.

The requirement that each of the reforming surfaces be formed of a rigid material is important since non-rigid surfaces can affect optical quality. Hence, whereas the use of non-rigid sheeting such as, for example, silicone rubber sheeting can help to eliminate heat loop defects due to air trapped between a thermoplastic film and a flat plate reforming surface, the elastic nature of the rubber film can, at pressures sufficient for the removal of manufacturing defects, cause a permanent rippled surface pattern to be formed on the thermoplastic film, particularly if precise control of heat and pressure are not exercised.

The conditions of temperature and pressure prevailing during the reforming process are not critical and the optimum conditions for any particular film are readily established by routine experiment. A temperature in excess of the glass transition temperature of the thermoplastic resin making up the film is selected in order to secure the permanent elimination of surface defects. For the purpose of the present description, the glass transition temperature of a thermoplastic resin is that temperature at which the resin changes to (or from) a viscous or yielding condition from (or to) a hard, relatively brittle one. For a more precise definition of the glass transition temperature, and a description of measuring methods, reference may be had to the 1977 Book of ASTM Standards, Part 35, Designation D3418-75.

Of course, the glass transition temperature of any film depends on factors such as film purity, thermal history or the like, but typical glass transition temperatures for some common film-forming resins are shown in Table I below:

TABLE I

| Resin | Transition Temperature Tg (°C.) |
| --- | --- |
| Poly(methyl methacrylate) | 100 |
| Polycarbonate | ~130 |
| Cellulose Acetate Butyrate | 50 |
| Ionomer | 175-290 |

TABLE I-continued

| Resin | Transition Temperature Tg (°C.) |
| --- | --- |
| Polyvinyl Alcohol | 220 (melting point) |

As previously noted, best results are obtained if the pressure is increased to the selected maximum pressure over the length of the pressing cycle. That is, pressing is first commenced at a relatively low value, such as the mold contact pressure, and thereafter raised to the maximum pressure (typically not exceeding about 700 psi), either continuously or by stepwise increments.

The minimum pressing time necessary for the permanent removal of surface defects at or above glass transition temperatures depend upon both resin composition and actual temperature, with the optimum time again being readily determined by experiment. However, pressing cycles lasting 5-60 minutes are ordinarily suitable.

As previously noted, it is preferred that the thermoplastic film be cooled to room temperature prior to separation from the reforming surfaces if precise curvature matching to those surfaces is desired. For this reason it is advantageous to use small rigid pressing pieces as mold inserts which can be readily removed from the hot-pressing apparatus with the reformed plastic film as a single assembly. Such an assembly can be quickly cooled to room temperature and the inserts easily separated from the reformed film, thereby substantially reducing cycle time for the reforming process.

The reforming process of the invention may be used with essentially any thermoplastic film, but is particularly advantageous when used to produce curved optical elements from tough, optically clear films, especially films formed from polycarbonate, polyvinyl alcohol, cellulosic and ionomer thermoplastic resins. Cellulosic films which may be treated include cellulose acetate, cellulose propionate, and cellulose acetate butyrate films. Of course, films of somewhat lower clarity and-or toughness, such as polyvinyl chloride films, or more brittle thermoplastic films, such as films composed of acrylic or acrylic copolymer thermoplastic resins, may also be reformed as herein described.

The requirement of differing radii of curvature in the rigid pressing pieces is critical to the obtainment of optical quality in the reformed plastic film; it is estimated that a curvature radius difference in the range of about 1-25 mils is required for this purpose. Ground and polished glass ophthalmic lenses provide the most satisfactory reforming surfaces for use in the invention, because these have excellent surface quality and are available over a wide range of diopter curvatures.

It is difficult to grind a specific pair of lens blanks to provide the curvature difference required for thin film reforming because conventional grinding equipment can reproduce a selected curvature to only within about 1/16 of a diopter (about 25 mils of curvature radius). Because of these variances, however, it is a routine matter to select a pair of lenses having the required curvature difference from among a relatively small group of lenses (e.g., 10 lenses) which have been commercially ground and polished to the same nominal curvature (e.g., 6¼ diopter).

Although the foregoing discussion is primarily directed to cylindrically or spherically curved surfaces for reforming thermoplastic films, it will be recognized that the techniques herein described may also be extended to the use of surfaces of compound curvature. Thus appropriately matched reforming surfaces having combined spherical and cylindrical curvature may be successfully used to reform thin, tough thermoplastic films, provided that the convex reforming surface has at least one radius of curvature less than the corresponding radius of curvature of the concave reforming surface.

The invention may be further understood by reference to the following detailed examples thereof.

EXAMPLE 1

A circular piece of cellulose acetate butyrate about 70 mm in diameter is cut from a section of flat, commercial grade 15-mil thick film. Such film is commercially available as Kodacel ® film from Eastman Chemical Products, Inc., Kingsport, Tenn. This circular piece is cleaned with isopropanol and then, under essentially dust-free conditions, is positioned in a reforming assembly.

The critical elements of the reforming assembly are two ground and polished silicate glass ophthalmic lenses, the convex reforming surface of one of the lenses having a radius of curvature which is roughly estimated to be about 20 mils smaller than the radius of curvature of the concave reforming surface of the other lens. Theses lenses were selected from a batch of ten 70-mm (diameter) ground and polished lenses having a nominal front and back surface curvature of $6\frac{1}{4}$ diopters, being the pair of lenses exhibiting the largest circumferential edge gap from among that group.

To provide the reforming assembly, a concave 6 diopter stainless steel mold is positioned on the bottom platen of a hot pressing machine, a 60-mil sheet of silicone rubber is positioned in the mold, the lens providing the concave reforming surface is positioned on the rubber sheet, the 70-mm disc of cellulose acetate butyrate is positioned in the lens, the lens providing the convex reforming surface is positioned on the cellulose acetate butyrate film, a 30-mil sheet of silicone rubber is positioned in the top pressing lens, a $6\frac{1}{4}$ diopter soft alloy weight is positioned on the top rubber sheet, and a steel plate is positioned between this top alloy weight and the top platen of the hot pressing machine.

After these elements have been assembled, reforming of the cellulose acetate butyrate film is accomplished by heating the assembly to 260° F. and maintaining the film under contact pressure (approximately 1 psi) for 30 seconds, thereafter increasing the pressure to 140 psi and maintaining this pressure for 7 minutes, thereafter increasing the pressure to 280 psi and maintaining this pressure for 3 minutes, and finally increasing the pressure to 420 psi and maintaining this pressure for 6 minutes.

After this pressing cycle is completed, the pressure is released and the soft alloy piece, top rubber sheet, and pressing lens pair with the reformed cellulose acetate butyrate sheet therebetween are removed from the hot pressing machine and cooled to room temperature with compressed air. The pressing lens pair and reformed cellulose acetate butyrate sheet are then placed in an ultrasonic bath for 2 minutes to implement separation of the pressing lenses from the reformed plastic.

The reformed cellulose acetate butyrate piece obtained by this process (an element of nominally zero focal power by virtue of the fact that both front and back surfaces thereof have the same nominal $6\frac{1}{4}$ diopter curvature), exhibits excellent optical quality, completely free of heat-loop defects, and also free of the streaks present in the original film which has been imparted during the manufacturing process and which had rendered the original film unsuitable for direct use in an ophthalmic system. The curvature of the reformed piece precisely matches that of a $6\frac{1}{4}$ diopter lens, permitting stress-free lamination to such a lens without optical distortion.

EXAMPLE 2

A 70-mm diameter circular piece of cellulose acetate butyrate film is cut from a 13.5-mil thick sheet of Kodacel ® cellulose acetate butyrate of ordinary commercial quality, obtainable as above described. The piece is cleaned with isopropanol and positioned in a reforming assembly substantially as described in Example 1 above.

To successfully reform this film, a reforming cycle comprising first heating the reformig assembly and film to 255° F. at contact pressure for 30 seconds, thereafter increasing the pressure to 140 psi and maintaining the assembly at this pressure for 10 minutes, thereafter increasing the pressure to 280 psi and maintaining the assembly at this pressure for 3 minutes, and finally increasing the pressure to 420 psi and maintaining the assembly at that pressure for 5 minutes is utilized. After the cycle has been completed, the pressure is released and the pressing lenses with the reformed cellulose acetate butyrate sheet and soft alloy pressing piece are removed and cooled to room temperature as a unit.

After separation of the reformed plastic from the glass pressing pieces in an ultrasonic bath as described in Example 1, examination of the reformed plastic indicates that excellent optical quality and precise curvature have again been obtained. It was found that, for this slightly thinner film, the lower temperature and longer holding time at 140 psi were helpful in removing trapped air from the reforming assembly and avoiding the introduction of heat loop defects.

EXAMPLE 3

A laminated thin film assembly to be reformed into a curved assembly of optical quality is provided, consisting of a 70-mm circular laminated piece comprising 0.5 mil polyvinyl alcohol polarizing film sandwiched between two layers of 5-mil thick cellulose acetate butyrate film. This laminated film is commercially available as B42/10UV film from Baum Chemical Corp., Van Nuys, Cal. This place is positioned in the reforming assembly substantially as described in Example 1.

Reforming of this laminated film is accomplished by heating the reforming assembly to a temperature of 270° F. and maintaining the assembly at that temperature under contact pressure for 30 seconds, thereafter increasing the pressure to 140 psi for about 7 minutes, thereafter increasing the pressure to about 280 psi for about 3 minutes, and finally increasing the pressure to about 420 psi for about 5 minutes. After this reforming cycle is completed, the pressure is released and the pressing lenses with the reformed laminated film are removed and cooled to room temperature with compressed air. The pressing lenses are then separated from the laminated film in an ultrasonic bath as described in Example 1.

The reformed laminated film produced by this process exhibits excellent optical quality and precise curvature matching with $6\frac{1}{4}$ diopter lenses. The higher reforming temperature (270° F.) utilized in the reforming process is due to the higher glass transition temperature of the polarizing polyvinyl alcohol film. The reforming process does not result in any losss of polarizing efficiency in this film.

EXAMPLE 4

A 70-mm diameter circular piece of 10-mil thick polycarbonate film is cut from a sheet of 10-mil film of ordinary commercial quality. This film is commercially available as Lexan ® polycarbonate film from the General Electric Corp., Pittsfield, Massachusetts. To reform this film to provide 5 diopter curvature and excellent optical quality, a pair of 70-mm pressing lenses of 5 diopter curvature is selected from among a batch of 10 commercially ground and polished lenses of 5 diopter nominal front and back surface curvature. The pair of lenses exhibiting the largest circumferential edge gap is selected, with the difference in radii of curvature between the convex reforming surface and the concave reforming surface of this lens pair being estimated at about 20 mils.

A reforming assembly is provided by positioning a concave stainless steel mold of 5 diopter curvature on the bottom platen of the hot pressing machine, positioning a 60-mil sheet of silicone rubber on this mold, positioning the bottom pressing lens on this silicone rubber sheet, positioning the 10-mil polycarbonate film disc on the bottom lens, postioning the top pressing lens on the polycarbonate film, placing a 60-mil sheet of silicone rubber over the top pressing lens, and positioning a convex stainless steel mold of 5 diopter curvature between this silicone rubber sheet and the top platen of the hot pressing machine. Reforming of the polycarbonate sheet is then accomplished by heating the reforming assembly to a temperature of 310° F. and maintaining the assembly under contact pressure for 3 minutes, and thereafter increasing the pressure on the assembly to 420 psi for 5 minutes.

The pressing lens pair with the reformed polycarbonate sheet are then removed from the assembly and cooled to room temperature with compressed air. The pressing lenses and reformed plastic sheet are soaked in an ultarsonic bath for 10 minutes to facilitate separation of the reformed sheet from the glass lenses.

Examination of the reformed plastic indicates that excellent optical qualtiy and precise curvature matching to 5 diopter lenses has been obtained. The reformed plastic element (an element of nominally zero focal power by virtue of the fact that both front and back surfaces thereof have the same nominal 5 diopter curvature), is free of distortion and extrusion streaks present in the polycarbonate sheet from which it was originally selected. The foregoing procedure is also useful to reform 5-mil polycarbonate film with excellent results.

The above examples, while merely illustrative, clearly demonstrate the advantages of the invention as applied to the rapid and accurate reforming of thin, tough thermoplastic films. The elimination of the requirement for a vacuum reforming together with the capability for providing both precise curvature and ophthalmic quality in a single pressing operation are particularly significant.

The desirable optical qualities of plastic film elements provided in accordance with the invention render them suitable for direct use in optical systems. The lamination of these elements to glass lenses to provide tintable and/or polarizing glass-plastic composites of ophthalmic quality is one of many applications for which these reformed elements are uniquely suited.

I claim:

1. A method for reforming thin, tough thermoplastic film to provide a curved plastic element of nominally zero focal power, precise curvature, and optical quality, while avoiding the introduction of heat loop defects into the element, which comprises the steps of:
    selecting for reforming a tough thermoplastic film having a thickness less than or equal to about 0.015 inches;
    heating the thermoplastic film to a temperature above its glass transition temperature while pressing the film between a rigid reforming surface of convex curvature and a rigid reforming surface of concave curvature, each of said surfaces being finished to optical quality and having the same nominal diopter curvature, the convex reforming surface having a radius of curvature which is about 1–25 mils less than the radius of curvature of the concave reforming surface; and cooling the thermoplastic film to a temperature at least below its glass transition temperature prior to separating the film from the reforming surfaces.

2. A method in accordance with claim 1 wherein the thermoplastic film is selected from the group consisting of cellulosic, polycarbonate, acrylic, polyvinyl alcohol and ionomer resin films.

3. A method in accordance with claim 2 wherein the thermoplastic film has a thickness in the range of about 0.001–0.015 inches.

4. A method in accordance with claim 1 wherein the thermoplastic film is cooled to room temperature prior to separating the film from the reforming surfaces.

* * * * *